United States Patent [19]
Geenens

[11] 3,801,811
[45] Apr. 2, 1974

[54] LIGHTING FIXTURE ASSEMBLY FOR TUNNELS AND OTHER LOCATIONS

[76] Inventor: Leo Geenens, 649 S. Tamiami Trl., Venice, Fla. 33595

[22] Filed: Nov. 15, 1971

[21] Appl. No.: 198,525

[52] U.S. Cl........ 240/51.11 R, 174/52 R, 240/73 R, 240/85 R
[51] Int. Cl. .......................................... H05b 33/02
[58] Field of Search......... 240/3, 25, 51.11 R, 73 R, 240/85 R; 174/48, 52 R

[56] References Cited
UNITED STATES PATENTS

| | | |
|---|---|---|
| 2,998,508 | 8/1961 | Bobrick............... 240/51.11 R X |
| 3,692,920 | 9/1972 | Santarelli.................... 174/48 |
| 3,077,536 | 2/1963 | Garnett................... 240/73 R |
| 2,476,856 | 7/1949 | Geenens.............. 240/51.11 R |
| 3,473,017 | 10/1969 | Lim et al................ 240/73 R |
| 3,243,587 | 3/1966 | Relich............. 240/51.11 R X |
| 3,459,936 | 8/1969 | Miller....................... 240/73 R |

Primary Examiner—Fred L. Braun
Attorney, Agent, or Firm—J. B. Felshin; Marvin Feldman

[57] ABSTRACT

This lighting assembly for tunnels and like locations, comprises spaced cable boxes attached to an outer surface of a wall of the tunnel and interconnected by pipes. The power cables pass through the pipes to the cable boxes. The cable boxes and pipes are not embedded in the wall, and hence the location and spacing of the boxes can be changed. A bracket comprising a box for receiving a transformer, is detachably attached to each cable box. The bracket is swingably connected to the cable box so that when it is detached, therefrom the bracket can swing down to hang below the cable box to facilitate servicing the cables within the cable box. Each bracket carries an open ended chamber to receive adjacent ends of adjacent cartridges for fluorescent lamps. With such assembly, the installation can take place after the roadway and wall surfaces of the tunnel are in place, with greater facility, thus ensuring parallel relationship between the cable boxes and the roadway of the tunnel.

7 Claims, 13 Drawing Figures

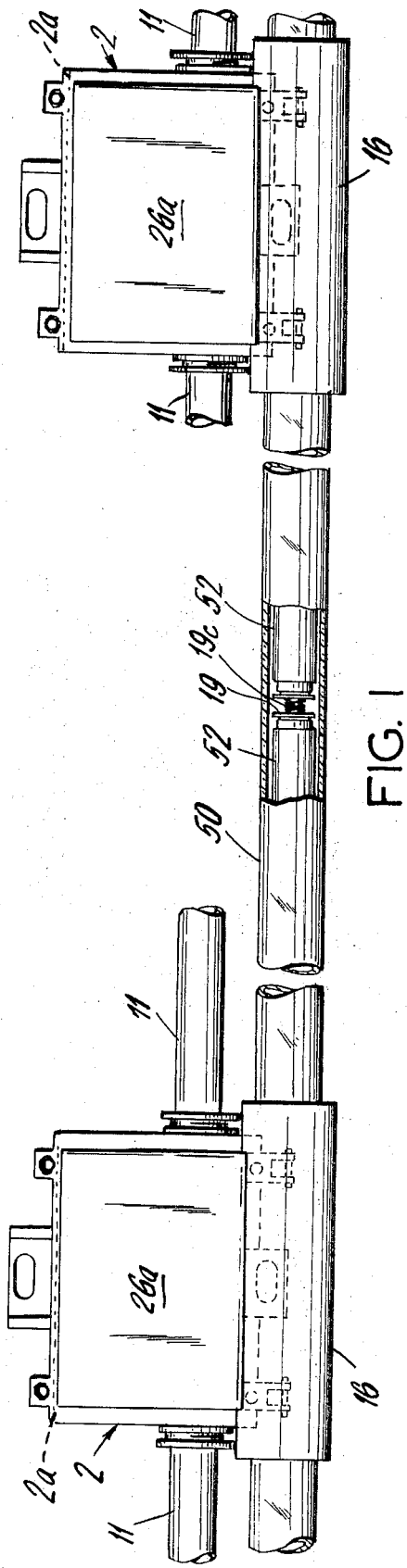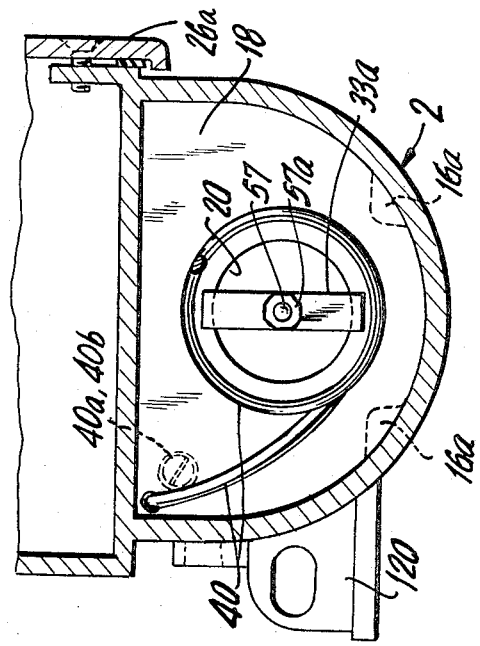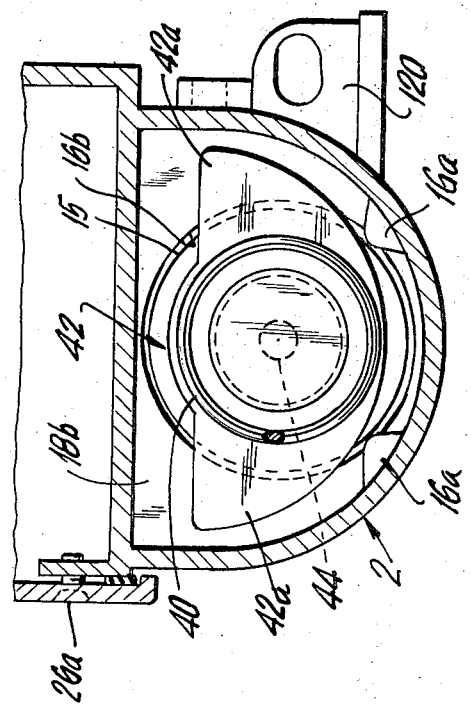

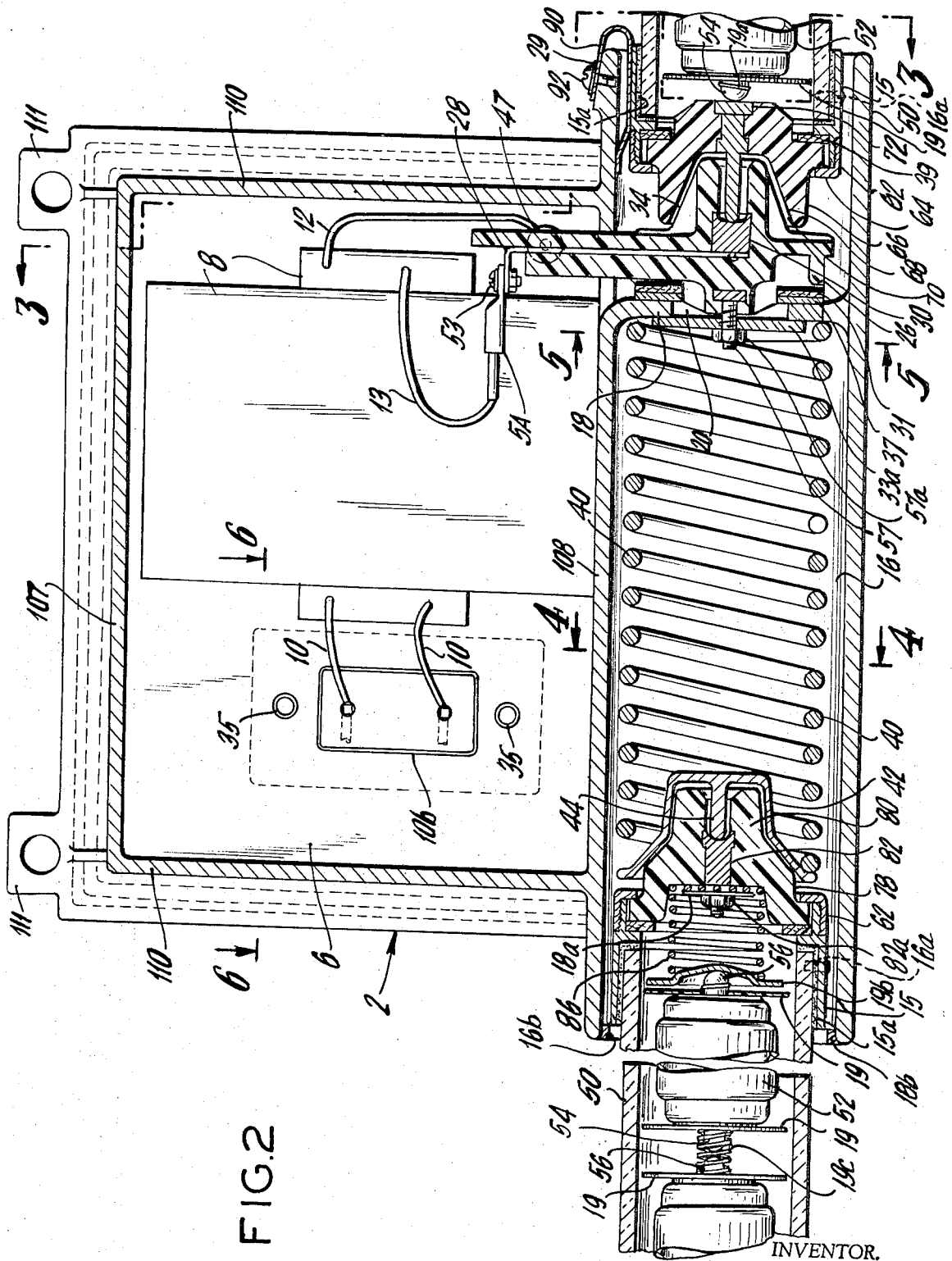

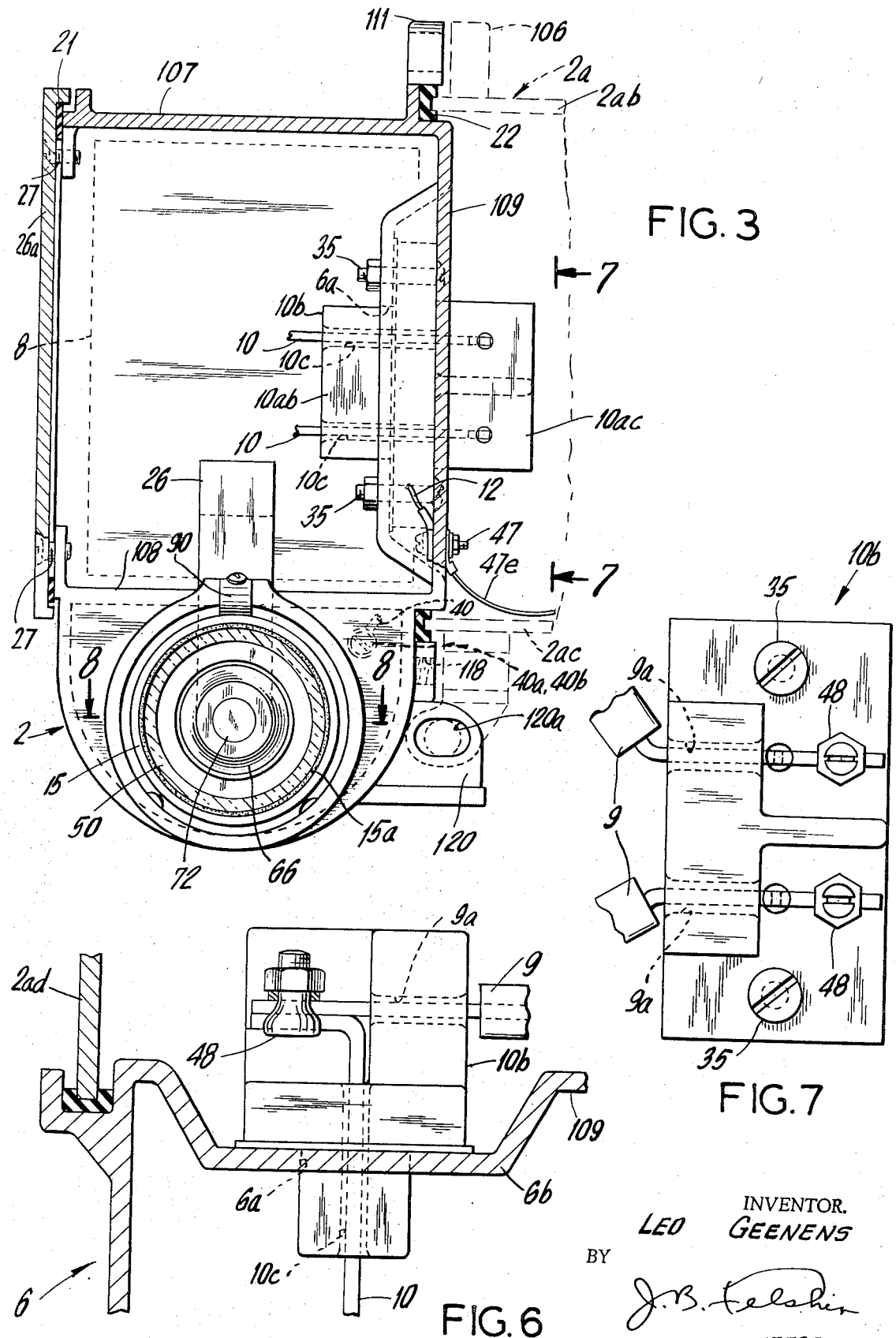

INVENTOR.
LEO GEENENS
BY
J. B. Felshin
ATTORNEY

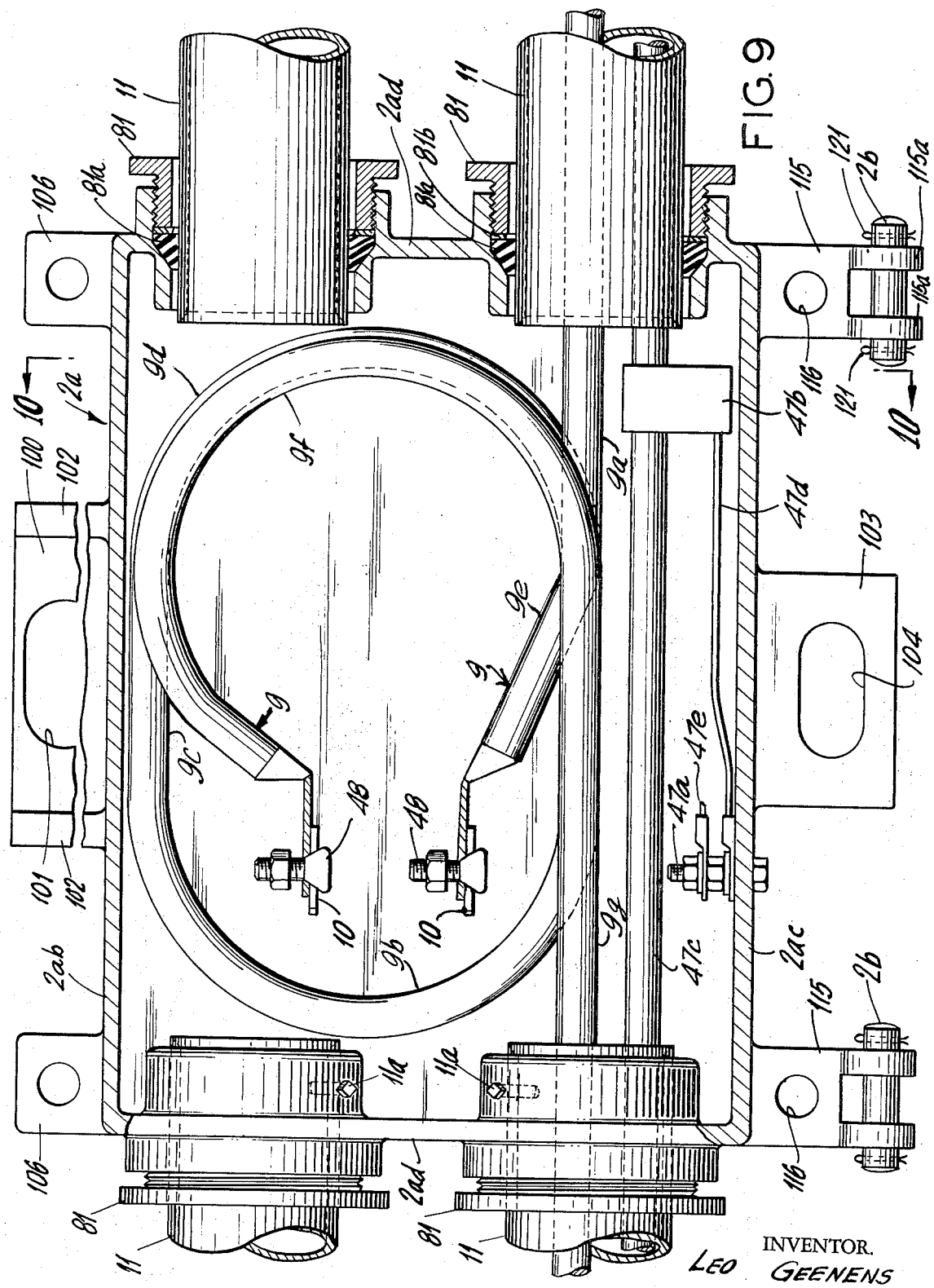

LIGHTING FIXTURE ASSEMBLY FOR TUNNELS AND OTHER LOCATIONS

This invention provides means to further improve the advantages provided by U.S. Pat. No. 2,476,856. The embedded cable boxes 2a of the patent did establish a fixed spacing between brackets 2 which in turn established a length of fluorescent tubes which can be used in the fixture. As vehicular tunnels are built to last a great many years, this fixed spacing precludes the adoption of new lighting sources of different dimensions, varying in length and cross-section. By providing a lighting fixture assembly entirely surface mounted it becomes economically possible to adapt the fixture to new light sources. The surface mounting is also a decided advantage and a great saving of costs during the construction of the tunnel. The placing of the cable boxes and connecting pipes in the concrete forms is a difficult and tedious work due to the narrow spacing between the forms and the steel shell of the tunnel. It is important that the boxes be set strictly in a continuous line parallel to the roadway but when the concrete walls are being built there is no practical base line from which to measure the elevation. With a surface mounted system the installation takes place after the roadway and wall surfaces are in place which greatly facilitates and reduces the cost of installation.

To install the brackets under the design of U.S. Pat. No. 2,476,856, elaborate supporting and lifting saddles were required to support the brackets while connection of the power wires are being made and to afterwards lift the brackets in place, as the weight is such that the brackets cannot be held up by hand for the time required to make the connection. Further, if inspection of the cable box is necessary, the brackets could not be suspended from the power wires without disturbing the connections. This condition is now eliminated by hanging the bracket from hinge pins secured to the cable box. The cable boxes are first attached to the wall with anchor bolts and afterwards the brackets are suspended from the cable boxes. While so suspended, the power wires are conveniently connected to the brackets and the brackets are then swung into position against the cable boxes and bolted thereto. It becomes a one man operation which is particularly desirable for future maintenance.

The threaded glass ends of the jackets covered by U.S. Pat. No. 2,476,856 have been eliminated. They constitute a source of breakage of the glass jackets. The threaded glass ends were produced separately and fused to the glass jackets. These assemblies were costly and had to be annealed in order to relieve the unequal stresses. The jackets are now individual glass tubes to which outside threaded metal ferrules are cemented.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, FIG. 1 is a front view, partly in section, on a reduced scale, of several cartridges mounted in line in their respective brackets, forming the subject matter of this invention.

FIG. 2 is a section along the vertical plane passing through the center line of the cartridge and brackets, showing the transformer with high and low voltage connections and cooperating with the adjacent ends of two cartridges.

FIG. 3 is a vertical cross-section on line 3—3 of FIG. 2;

FIG. 4 is a vertical cross-section on line 4—4 of FIG. 2;

FIG. 5 is a vertical cross-section on line 5—5 of FIG. 2;

FIG. 6 is a horizontal cross-section on line 6—6 of FIG. 2;

FIG. 7 is a vertical cross-section on line 7—7 of FIG. 3;

FIG. 9 is a front view, partly in section, of cable box 2a;

FIG. 11 is a vertical view of the top holding lug of cable box 2a;

Figure 8:
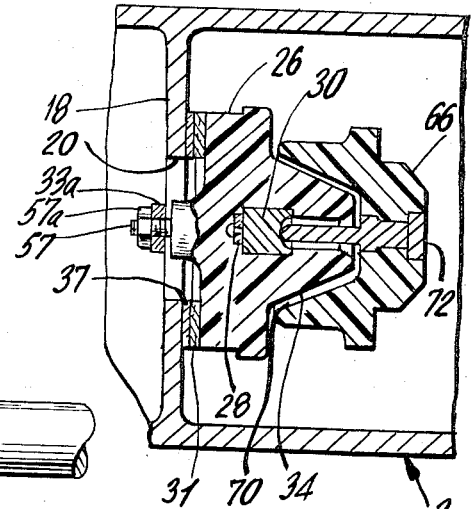
FIG. 8 is a partial horizontal section on line 8—8 of FIG. 3.

Referring now to the drawings, the fixture comprises a metal bracket with bare or painted or porcelain enameled surfaces, hinged and bolted, with bolts 2c, to cable box 2a in turn bolted to the wall with bolts 2d.

The bracket 2 includes a box 6 for transformer 8, which box is closed in front with cast metal cover 26a held by screws 27 and gasket 21. The two primary leads 10 of the transformer 8 are brought out of the box 6 through a glazed porcelain insulator 10b secured to the box by two screws 35. This insulator passes through an opening 6a in recessed wall 6b of box 6. The power cables 9 are extended through narrow holes 9a in insulator 10b to restrict their motion while the bracket 2 is hinged in place. The power cables meet the transformer primary leads 10 at the ends of the holes 9a in insulator 10b and are connected to the leads 10 of the transformer by clamps 48. Leads 10 pass through narrow holes 10c in the insulator 10b. Said insulator 10b has a portion 10ab projecting into box 6 and a portion 10ac projecting into cable box 2a.

The secondary lead 13 of the transformer 8 is connected to the fluorescent lamps in the manner to be described below. The low voltage lead 12 of the transformer is grounded to bracket 2 by means of screw 47 which also carries the grounding wire 47e of bracket 2. Grounding wire 47e is connected to the cable box with screw 47a, with enough slack to permit opening of bracket 2 around its hinge pins 2b to be described hereinafter.

The drawing shows a series connection of the primary windings of the successive transformers as used in a series system of power distribution, but the fixture will operate likewise if the primaries of successive transformers are connected in parallel in a multiple system of power distribution.

Bracket 2 also includes an open-ended horizontal chamber 16. This chamber has an inwardly extending annular rib 18 defining an opening 20. Seated against rib 18 is a metal washer 37 supporting an asbestos washer 31. Seated against this washer is a high-voltage moulded insulator 26 into which is moulded a high voltage conductor 28 energized by its connection through screw 53 and lead 5A, to secondary lead 13 of the transformer. Conductor 28 terminates into contact block 30 likewise moulded into insulator 26. A stud 57 moulded into the same insulator 26 extends through opening 20 and cleat 33a and holds insulator 26 against asbestos washer 31 by means of nut 57a, screwed onto stud 57.

Seated against the other side of rib 18 is one end of a grounding coil spring 40, at the outer end of which is a low voltage terminal cup casting 42 provided with a cast-on contact pin 44. The inner end of spring 40 is annealed and brought through a hole in rib 18 and connected to rib 18 by means of screw 40a with washer 40b, thereby effecting a bolted contact with metal bracket 2.

At the left end of chamber 16 (FIG. 2) there is a rib 18b having a circular opening 16b for the introduction of spring 40. Cup washer 42 at the outer end of spring 40 is shaped in such a way that it can pass through the opening 16b in the rib 18b of chamber 16, but has wings 42a which rest against the inside of the rib 18b (FIG. 4) under the pressure of spring 40 thereby retaining the spring inside chamber 16 when the lighting cartridge is removed. Pairs of tabs 16a at the inside of chamber 16 contact the ferrules 15 of the cartridges to support said cartridges.

The lighting cartridge, for quick connection and disconnection with the foregoing bracket, will now be described. This lighting cartridge comprises a straight tubular jacket 50 of glass or other transparent or translucent material, within which is coaxially housed one or more fluorescent tubes 52, of the hot or cold cathode type, having a single electrode 54 at one end and a single electrode 56 at the other end of the container.

Fluorescent tubes 52 are positioned in the jacket 50 by annular transparent plastic washers 19. At the connection point when several lamps are used in series, the lamp electrodes 54 and 56 are joined with a coil spring 19c (FIGS. 13, 1, 2) which grips the electrodes and establishes electrical contact between the lamps.

At the high and low voltage ends, jacket 50 has cemented thereon by means of cement layer 15a, a ferrule 15 to which is threaded a cast metal cap 62 having a terminal flange 64 for holding an insulating closure plug 66.

At the high voltage end, the closure plug 66 is an insulating moulding which is recessed as at 68 to fit over, but in spaced relation with projection 34, to define therebetween a drainage passage 70 for water and cleaning solution. Moulded into closure plug 66 is high voltage electrode pin 72 which connects the high voltage terminal block 30 with terminal 54 of the fluorescent tube 52.

At the low voltage end the closure plug 78 is an insulating moulding with an annular projection 80. Closure plug 78 is centrally recessed to receive the low voltage contact pin 44 of cup 42 which bears against electrode 82 in the recess. Electrode 82 at its left end (FIG. 2) carries a threaded stud with nut 82a, which retains a washer 18a which in turn grips a connection spring 86. This spring at its left end retains a cupped washer 19b which presses against the electrode 56 at the adjacent end of the fluorescent tube 52.

It will be apparent that the low voltage connections just described apply to a second jacket 50 and light 52 of the next aligned lighting cartridge, and that the described connections are duplicated at the right hand end (not shown) of jacket 50 and light 52 shown at the right of FIG. 2.

It will be seen that to insert a lighting cartridge, the right hand end must be inserted in cup 42 and pushed to the right to compress spring 40 until the left hand end of the lighting cartridge has cleared the lower edge of cavity 16 after which the left hand end can be lifted and inserted over plug 34. If, however, the left hand end of the lighting cartridge was inserted first over plug 34 and an operator would hold his hand over insulator 80 his hand would not come in contact with electrode 82 because of the insulator 80 and therefore he would not complete the circuit of the lamps and be subjected to an electric shock.

An accumulation of dust, carbon, moisture, etc., on the exterior of jacket 50 of the light cartridge might form a conductive layer that would be dangerous to an operator grasping jacket 50 of the light cartridge for removing it. In order to avoid this, bracket 2 is provided with a resilient grounding spring 90, anchored by screw 92, and washer 29 which bears against the metal ferrule 15 of the lighting cartridge, as shown at the right of FIG. 2. Any stray voltage emanating from pin 72 over the surface of insulator 66 is thereby grounded. This spring is preferably made of phosphorbronze The described lighting cartridges are preferably mounted in a continuous straight line and two or more may be in series, as in FIG. 1.

There is enough clearance of the cartridge in chamber 16 to permit a long radius curvature of the wall to which the fixture is secured.

In operation, with a lighting cartridge in operative position, as in FIG. 2, a defective light may be quickly removed by an operator who grasps the cartridge, moves it to the right against spring 40, sufficiently to disengage and clear the interfitting insulators 34 and 66, to clear the right hand end of cavity 16 and of course, breaking the high voltage connection between electrode 72 and contact 30. The cartridge is then moved downwardly and pulled out of low voltage terminal cup 42 and clear of the left hand edge of cavity 16 in the adjacent bracket. A new cartridge may be inserted by reversing these operations. These operations may be performed in a few seconds, an important consideration in vehicular tunnels where traffic should be interrupted for as short a time as possible.

This quick change is made possible by the improved lighting cartridge, comprising the jacket 50, the fluorescent tube mounted therein, and the contact electrodes at each end of the cartridge; it is also made possible by the improved bracket, built as described, to cooperate with such improved lighting cartridge.

Lighting cartridges and brackets as described may be washed and cleaned by a pressure stream of cleaning solution and water, without danger of grounding through the stream. The right hand end of cavity 16 and the zig-zag passage 70 impede the flow towards high voltage contact 72 but any water or solution which may reach this contact will drain away. Any stray high voltage current is grounded by the grounding spring 90.

Figure 13:
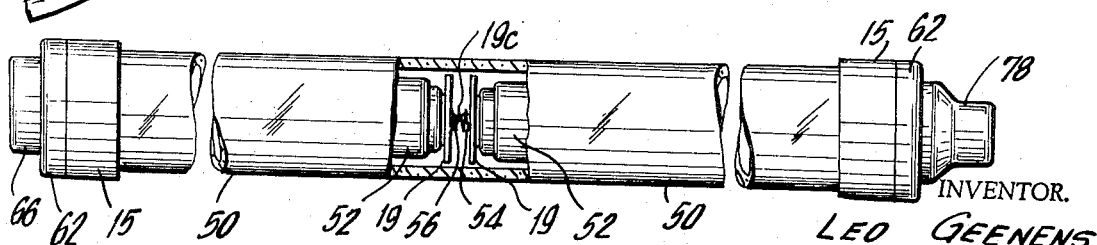
FIG. 13 is a front view of the lighting cartridge.

With the cartridge of this invention, shown in its entirety in FIG. 13, the relatively fragile light tubes 52 are always protected by the heavier protecting jacket 50. The rigidity afforded by the heavier jacket 50 provides a cartridge of substantial length, much longer than could be spanned by an ordinary fluroescent lamp; a single jacket 50 therefore carries several lamps in line, as shown in FIG. 13.

A particularly important feature of the jacket 50 is that it encloses an annular insulating body of air surrounding the lamps, serving to keep them relatively warm, which is especially valuable in winter, because the lighting effect of fluorescent lamps is greatly diminished at low temperatures.

The cartridges of the present invention may be assembled in a straight line, to provide a continuous line of light, from one end of a traffic tunnel to the other; this is a distinct improvement over spaced lights, where the rapidly passing vehicles cause intermittent light and dark flashes as the vehicles pass by such lights; with the substantially continuous light afforded by this invention, such light and dark flashes are eliminated. Any moisture is drained away through passage 70. Any stray high voltage is grounded through end ferrule 15 and contact 90.

An innovation consists in hinging the bracket 2 from cable box 2a, and surface mounting the assembly as a unit. The cable box 2a is no longer embedded in the wall of the tunnel as in U.S. Pat. No. 2,476,856.

Pipes 11 for the power cables extend from fixture to fixture. These pipes are held in place by gland fittings 81 screwed into the cable box, thereby compressing rubber packing rings 81a around the pipes by means of a stainless steel washers 81b. The pipes are not threaded, which reduces the cost of installation. Electrical contact is obtained between pipe and cable box by means of set screws 11a located at the entrance of the pipe in the cable box.

The pipe 11 carries, besides the power cables 9, a bare grounding cable 47c. A wire 47d clamped to wire 47c with clamp 47b connects cable 47c to a grounding stud 47a in the cable box 2a. To this stud is also secured the grounding wire 47e coming from stud 47 of bracket 2. In this way the pipes, cable boxes 2a and brackets 2 are all grounded permanently.

Figure 11:
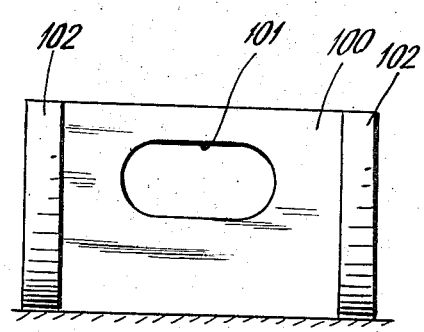

The arrangement greatly facilitates the installation of the lighting fixtures. The cable boxes 2a and pipes 11 are first anchored to the wall. Slotted holes shown in FIG. 11 for the anchor bolts permit accurate spacing of the cable boxes, after which the grounding cable 47c and power cables 9 are installed. The bracket 2 is now suspended from the cable box 2a through its hinge pins 2b which eliminates the need of scafolding to support the bracket while it is being connected.

With the unitary cartridge and cooperating fixture of the present invention, a defective or worn-out lamp may be very quickly replaced, with a minimum of interruption to traffic, a feature of particular importance in a traffic tunnel.

The cable box 2a is no longer embedded in the wall. It constitutes a joint unit with bracket 2 and tubes 11 and is now surface mounted against the wall. It no longer is suitable for suspension from the ceiling. This has numerous advantages, namely:

It has been a tedious job to install the cable box in the concrete form on account of the restricted space between the concrete form and the outer shell of the tunnel.

It establishes a fixed spacing between cable boxes which may interfere with future improvements to the lighting. With surface mounting this spacing can be changed without involving the structure.

As the fixtures are installed after the wall tiling is completed, it offers a clear space for measuring and locating anchor bolts which are drilled through the tile. Bracket 2 now hinges from the cable box 2a which is a convenience during the installation and later for maintenance. No scafolds are required while connecting the bracket or inspecting the interior of the cable box. Parts 26 and 32 of U.S. Pat. No. 2,476,856 are now replaced by a single moulding containing parts 28 and 30 and also containing a new center stud to hold the moulding in place, thus eliminating bolts 33. Part 33a has no more threaded holes but merely a center punched hole, all of which reduces the cost. Part 42 of the patent was a sheet metal stamping with a center stud and nut. This assembly is now a single casting part 78 with contact 82, and threaded washer 84 of the patent is now a single moulding embodying the contact 82.

The threaded glass ends of jacket 50 of the patent have been eliminated. They constituted a source of breakage of the glass jackets. The threaded ends were produced separately and fused to the glass tube. It required annealing the ends as the difference of the expansion of the threaded end ferrules and the glass tube under the heat of the lamps caused breakage at this point. Now the ends of the jacket have no threads. Instead, a metal ferrule, threaded on the outside is cemented to the glass tube and the terminal cap 62 is now screwed to the ferrule. Both end arrangements for holding the closure plugs are identical so that part 74 with terminal flange 76 has now become part 62 with terminal flange 64. Wire 12d and shim 24 and also wire 41 of the patent are eliminated as the end of spring 40 is now bolted directly to rim or flange 18 which is part of bracket 2 and constitutes conducting metal.

Bolt 12a with transformer connection of wire 12 of the patent have been moved to the back of transformer box 6, and is now facing into the cable box.

The sheet metal cover of transformer box 6 of the patent, which was not watertight, is replaced by a cast cover, gasketed and fixed to the face of the transformer box 6 by screws 27, thus making the transformer box watertight.

The porcelain insulator 10b of the patent is replaced by a new porcelain insulator 10b, so shaped, that the power cables are held rigidly in small holes before being connected, whereby these cable ends cannot accidentally touch each other while the cables are bending when bracket 2 is being lifted from the open to the closed position around the hinge pins 2b.

Figure 10:
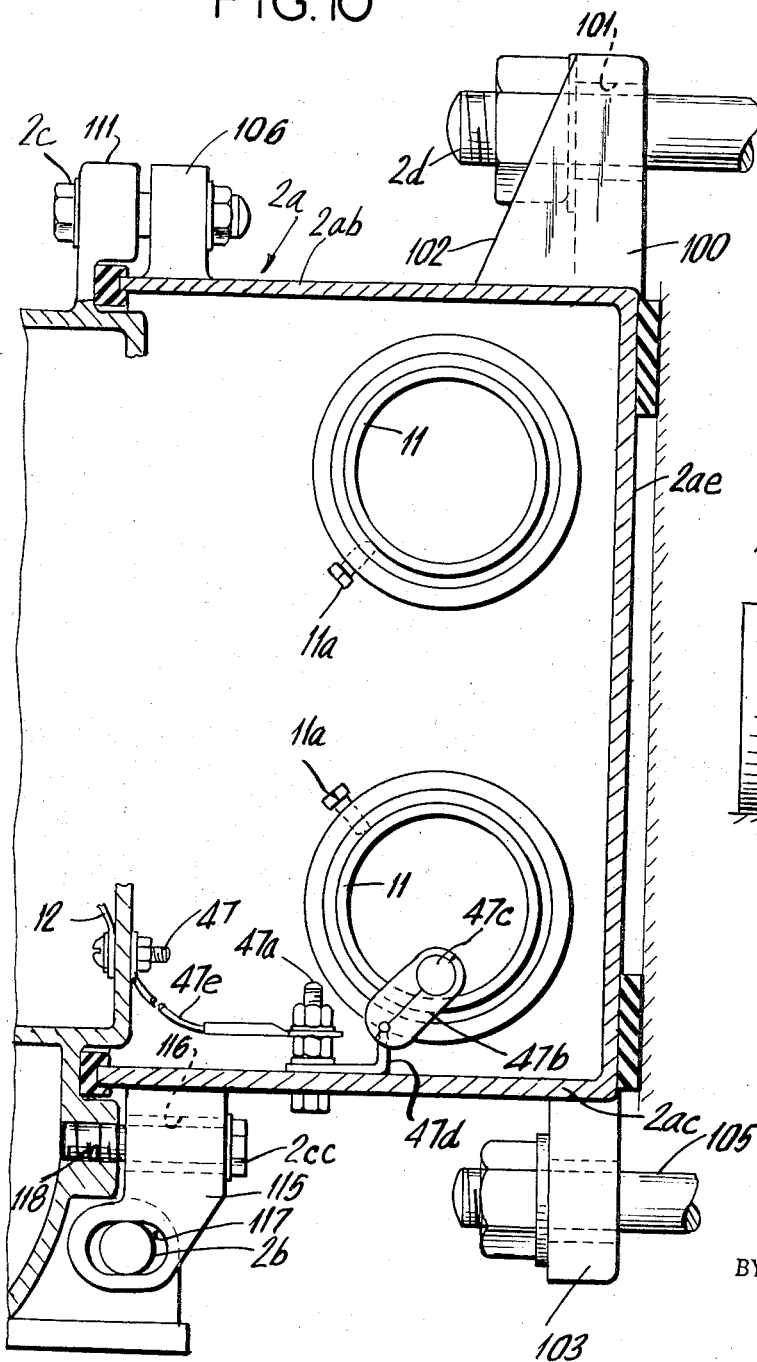
FIG. 10 is a vertical cross-section on line 10—10 of FIG. 9.
Figure 12:
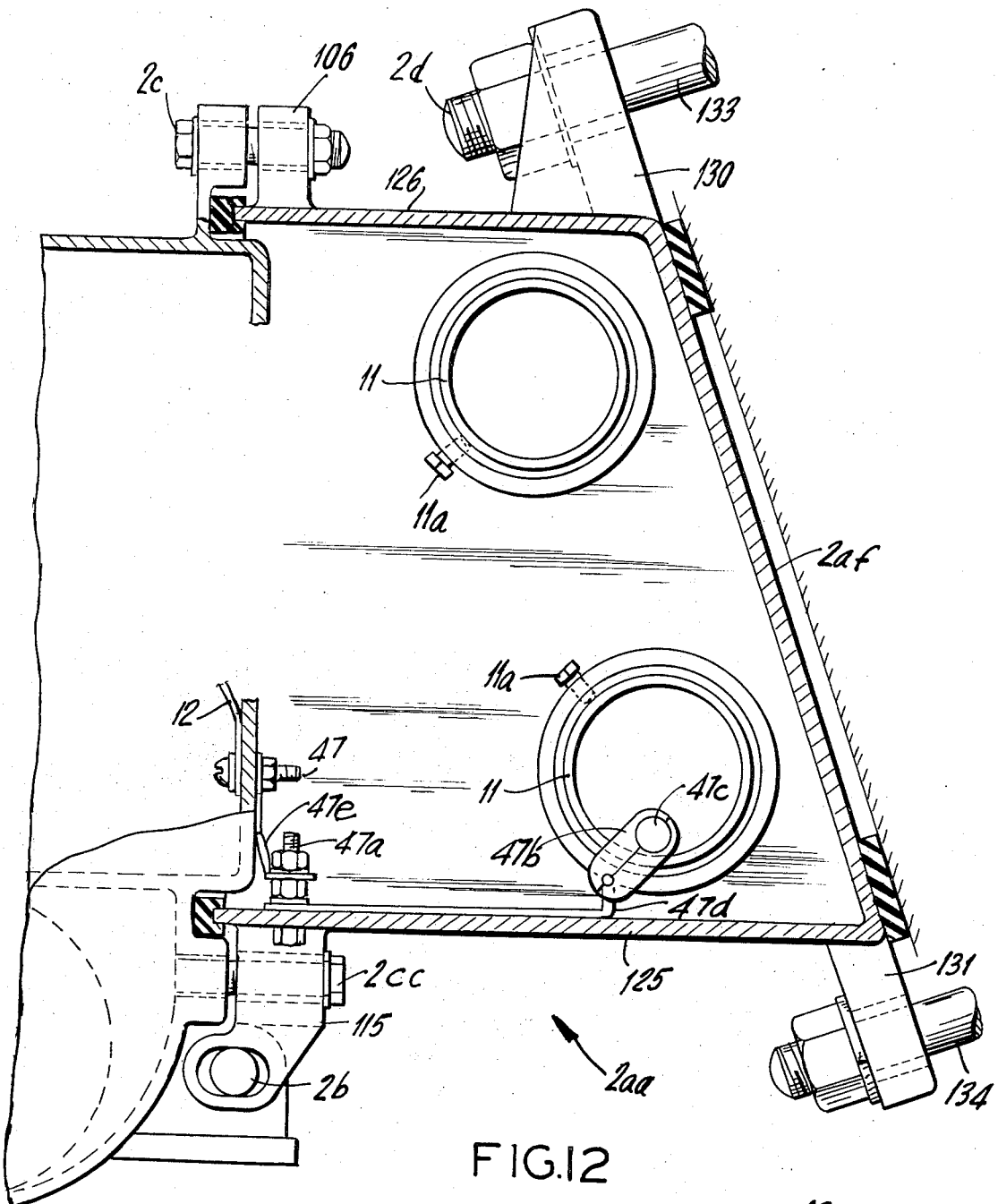
FIG. 12 is an alternative view, similar to FIG. 10 for sloping wall.

The cable boxes 2a each have a top wall 2ab, a bottom wall 2ac, side walls 2ad, and a rear wall 2ae. In FIG. 10 wall 2ae is vertical. In FIG. 12 which shows a modification to accommodate slanting tunnel side walls, the cable box designated by numeral 2aa is similar to cable box 2a except that the rear wall 2af slants downwardly and away from the open end of the box.

Cable box 2a is formed with a central upstanding lug 100 formed with a horizontal slot 101 to receive bolt or mounting stud 2d for adjustably fixing the cable box to a wall of the tunnel. Lug 100 may have reinforcing ribs 102 at its ends.

Said cable box 2a may also be provided with a central downwardly extending lug 103 formed with a horizontal slot 104 to receive a bolt or mounting stud 105 for adjustably mounting the box on the tunnel wall. Lugs 100, 103 are in the plane of the rear wall 2ae of cable box 2a.

Said box 2a is also formed at its open end with upstanding apertured lugs 106 at the ends of top wall 2ab, to receive bolts 2c which attach the cable box 2a to the transformer box 6.

Said transformer box comprises a top wall 107, a bottom wall 108, a rear wall 109 (provided with said depressed wall 6b) and end walls 110. Transformer box 6 is formed with a pair of upstanding apertured lugs 111 registering with lugs 106 for receiving said bolts 2c. Said lugs 111 are located in the plane of wall 109. Gasket 22 is interposed between the edges of box 2a at its open side and lugs 111, as shown in FIG. 3.

Extending down from the ends of bottom wall 2ac of box 2a, at the open side of said box, are apertured ears 115 formed with through openings 116 perpendicular to wall 2ae and with horizontal slots 117 perpendicular to the openings 116.

Wall 16 is formed with screw threaded openings 118 to receive screws 2cc passing through openings 116.

The lower ends of lugs 115 are bifurcated to form pairs of slotted ears 115a.

Wall 16 is formed with ears 120 which are received between ears 115a, and are formed with slots 120a registering with slots 117 in ears 115a. The pins 2b pass through the registering slots 117, 120a and are held in place by cotter pins 121.

Thus when screws 2cc are removed and bolts 2c are also removed, box 6 can be swung down and away from box 2a.

In box 2aa, the bottom wall 125 is wider than top wall 126. Said box 2aa has attaching lugs 130, 131 disposed in an inclined plane to receive the mounting studs 133, 134 respectively, thus facilitating attachment of box 2aa to a slanting or inclined wall of the tunnel.

Said box 2aa shown in FIG. 12 has attaching lugs 106,115 for attachment to the box 6, same as shown in FIG. 10.

In FIG. 10, the pipes 11 are in the same vertical plane. In box 2aa of FIG. 12, the axes of the pipes 11 are in an inclined plane parallel to wall 2af.

The cables 9 pass to the pipes 11 and through them.

If desired only one set of cables 9 can be used and these will pass through the lower pipes 11 only, for connection to all the lamps. In such case no cables will pass through the upper pipes 11. The ground cables pass only through the lower pipes 11.

As shown in FIG. 9, one cable 9 passes through the lower right pipe 11, to the left, into cable box 2a and extends almost through the box as at 9a, then curves around as at 9b and extends to the right as at 9c, then curves down at 9d and again to the left as at 9e and is screwed to the lower terminal 10 by screw 48. Screwed to the upper terminal 10 is one end of another cable 9 which curves around and down as at 9f and then extends to the left as at 9g and enters the left lower pipe 11.

If desired, the cables 9 in the lower pipes 11 can be used to energize sets of predetermined numbers of lamps spaced apart by intervening sets of equal numbers of lamps serviced by cables 9 in the upper pipes only. In such case if the power is reduced, then only alternate sets of lamps can be illuminated, leaving intervening sets dark.

A gasket 39 may be interposed between plug 66 and a flange on tube 15.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A lighting cartridge for fluorescent lamps comprising a transluscent tubular jacket, a closure plug of insulating material for each end of the jacket, a pair of fluorescent lamps in tandem in said jacket, lamp electrodes on the adjacent ends of said lamps, at the junction between said lamps, and conductive spring means at the junction between the adjacent ends of said lamps, making flexible, electrical and mechanical contact with said adjacent lamp electrodes, and light transmitting disc means on said adjacent lamp electrodes at said junction and between said lamps.

2. A lighting cartridge for fluorescent lamps, comprising a translucent tubular jacket, a closure plug of insulating material for each end of said jacket, each of said closure plugs being provided with an electrode passing through and fixed to the plug, a ferrule having a tubular portion telescoped onto and cemented on each end of said jacket, a metal cap screwed onto the outer end of each ferrule and having a flange engaging the associated plug to clamp it to the jacket, a tubular fluorescent lamp mounted in the jacket and electrodes in the ends of said lamp and means to maintain the electrodes of the lamp in electrical contact with the electrodes in the plugs, respectively.

3. The cartridge of claim 2, wherein the plug at one end of said jacket has a cavity at its outer end, and the electrode for said plug, projects into said cavity.

4. The cartridge of claim 3, further including a cup on the outer side of the plug at the opposite end of said jacket, said cup having an integral pin engaging the electrode of said plug at said opposite end of said jacket.

5. The cartridge of claim 2, further including a light transmitting disc on each electrode of said lamp.

6. The cartridge of claim 2, wherein the electrodes for said closure plugs are moulded into their associated plugs.

7. In combination, a cable box having a top wall, side walls, a bottom wall and a rear wall and being open at the front, a bracket, comprising a transformer box having a top wall, side walls, a bottom wall and a rear wall covering the front open side of the cable box, a transformer in said transformer box, means to detachably attach the rear end of said transformer box to the front end of the cable box, means to attach the cable box to a supporting surface with the rear wall of said cable box against said surface, means to hinge the lower rear side of the bracket to the lower front side of the cable box so that said bracket can be swung forwardly and downwardly to hang from said hinge means upon detaching said detachable attach means, cable pipes, means to attach the cable pipes to said side walls of said cable box, and forwardly of said supporting surface, and an open ended chamber at the lower end of said bracket and below the transformer box, to receive adjacent ends of cartridges for fluorescent lamps, and power cables in said cable pipes and cable box and electrically connected to said transformer, said means to attach said cable pipes to said side walls of said cable box comprising insulating friction glands in openings in said side walls in said cable box, said pipes projecting through said glands, and means to establish electrical contact between said pipes and said cable box.

* * * * *